(12) United States Patent
Rusmanov

(10) Patent No.: US 8,037,360 B2
(45) Date of Patent: Oct. 11, 2011

(54) SOFTWARE TESTING FRAMEWORK FOR MULTIPLE OPERATING SYSTEM, HARDWARE, AND SOFTWARE CONFIGURATIONS

(75) Inventor: Vassili Rusmanov, Tallinn (EE)

(73) Assignee: Symantec Corporation, Mountain View, CA (US)

( * ) Notice: Subject to any disclaimer, the term of this patent is extended or adjusted under 35 U.S.C. 154(b) by 1408 days.

(21) Appl. No.: 11/538,196

(22) Filed: Oct. 3, 2006

(65) Prior Publication Data

US 2008/0155338 A1    Jun. 26, 2008

(51) Int. Cl.
 *G06F 11/00* (2006.01)
(52) U.S. Cl. ...................................... 714/38.1
(58) Field of Classification Search .................. 717/134
 See application file for complete search history.

(56) References Cited

U.S. PATENT DOCUMENTS

| | | | | |
|---|---|---|---|---|
| 5,634,098 A * | 5/1997 | Janniro et al. | ............... | 714/38.1 |
| 5,701,408 A * | 12/1997 | Cornell et al. | ................... | 714/38 |
| 6,023,773 A * | 2/2000 | O'Donnell et al. | ............. | 714/40 |
| 6,182,245 B1 * | 1/2001 | Akin et al. | ................... | 714/38.14 |
| 6,195,765 B1 * | 2/2001 | Kislanko et al. | ............. | 714/38.1 |
| 7,062,602 B1 * | 6/2006 | Moore et al. | ................... | 711/112 |
| 7,272,549 B2 * | 9/2007 | Kortum et al. | ................... | 703/21 |
| 7,814,554 B1 * | 10/2010 | Ragner | ............ | 726/27 |
| 2003/0093420 A1 * | 5/2003 | Ramme | ............... | 707/3 |
| 2003/0221094 A1 * | 11/2003 | Pennarun | ......................... | 713/1 |
| 2004/0078692 A1 * | 4/2004 | Jackson et al. | ................. | 714/38 |
| 2005/0015666 A1 * | 1/2005 | Kamani et al. | ................... | 714/25 |
| 2005/0076237 A1 * | 4/2005 | Cohen et al. | ................... | 713/201 |
| 2005/0223362 A1 * | 10/2005 | Whitlock et al. | ............. | 717/126 |
| 2006/0282440 A1 * | 12/2006 | Fletcher et al. | ............... | 707/100 |
| 2007/0162510 A1 * | 7/2007 | Lenzmeier et al. | ........... | 707/200 |
| 2011/0035629 A1 * | 2/2011 | Noller et al. | ............... | 714/38.14 |

* cited by examiner

*Primary Examiner* — Robert Beausoliel, Jr.
*Assistant Examiner* — Neil Miles
(74) *Attorney, Agent, or Firm* — Advantedge Law Group

(57) ABSTRACT

Systems and methods are provided for testing software for use with a selected system configuration. The selected system configuration may include, for example, a selected operating system, a selected hardware configuration, a selected software configuration, and/or other information accessed by the software under test. The software calls a command line utility, a library and/or a file. During a test, the data returned by the command line utility, library and/or file is simulated based on the selected system configuration. In one embodiment, file system calls are isolated within a selected directory so as to protect a host system performing the test.

33 Claims, 4 Drawing Sheets

SOFTWARE TESTING FRAMEWORK FOR MULTIPLE OPERATING SYSTEM, HARDWARE, AND SOFTWARE CONFIGURATIONS

TECHNICAL FIELD

This disclosure relates generally to testing software. More particularly, this disclosure relates to a method for providing simulated, configuration-specific data to software under test and, when certain data may be corrupted during the test, localizing file system calls inside a specified directory.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Figure 1:
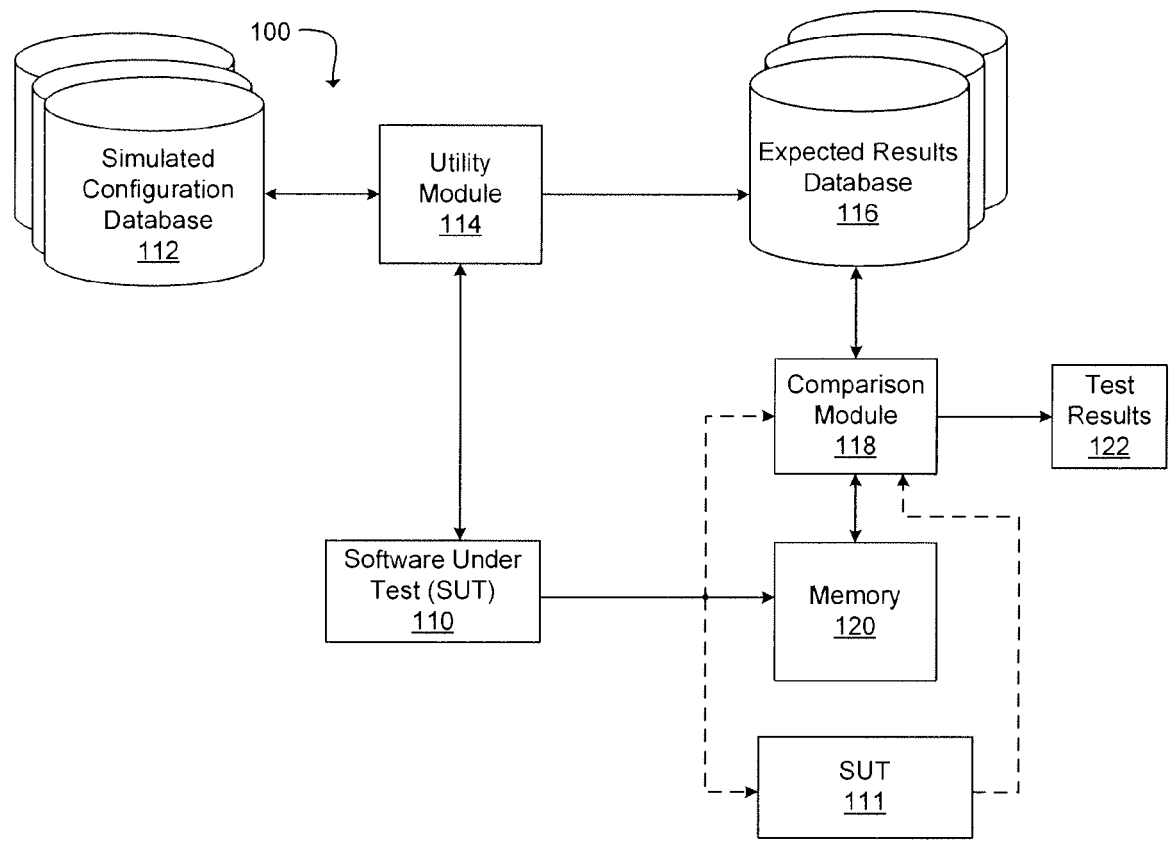
FIG. 1 is a block diagram of a system for testing software according to one embodiment.

FIG. 1 is a block diagram of a system 100 for evaluating software under test 110 (SUT 110) according to one embodiment. The system 100 includes one or more simulated configuration database 112 (three shown), a utility module 114, one or more expected results database 116 (three shown), a comparison module 118, and a memory device 120. The system 100 is operable on a host computer or server having a processor, an operating system, and computer readable instructions stored in the memory device 120.

Software may be configured to be used on many different system platforms. For example, software may be compiled to produce binary data that is executable by a particular operating system (e.g., UNIX, Linux, Mac OS, AIX, Solaris, HP-UX or other operating system) running on a particular processor architecture (e.g., x86, ARM, MIPS, SPARC, PA-RISC, or other processor architecture). To avoid using a separate test system for each target platform on which software is intended to run, software is generally tested using a system emulator. However, system emulators are generally expensive and emulate full systems such that every copy of the emulated system has a target operating system installed, which is very time consuming to achieve. System emulators are also generally executed on expensive hardware because they use a large amount of processing power and memory. Further, system emulators generally do not have enough performance to test real-time applications.

Thus, the system 100 is configured to test the SUT 110 without emulating entire platforms and without requiring installation of every target operating system version and/or system configuration. Rather, a unique host computer or server is used only for each target processor architecture running a particular operating system. For example, if the SUT 110 is compiled for a Linux operating system running on an x86 architecture, then one host computer having an x86 architecture and any Linux version may be used to test the SUT 110 for any x86 machine (e.g., from IBM, Dell, HP, or other manufacturer that uses the x86 architecture) or any Linux version (e.g., SUSE, Red Hat, etc.). Similarly, if the SUT 110 is compiled for a Linux operating system running on a Sun SPARC computer, then a corresponding SPARC/Linux host computer may be used. One of ordinary skill in the art having the benefit of this disclosure will recognize that many different processor architecture and operating system combinations are possible. Further, if the SUT 110 comprises a script language (e.g., Perl script or Shell script), then the host system may have any processor architecture running any operating system because scripts are not compiled.

As discussed in detail below, the system 100 simulates responses to selected command line utilities under one or more simulated system configurations. The simulated system configurations may include, for example, different operating systems or operating system versions, hardware configurations, software configurations, combinations of the foregoing, or differences in other system parameters that may change the operation of the SUT 110.

In one embodiment, the SUT 110 is configured to call a command line utility and to process the results returned from the utility. Depending on the operating system, the SUT 110 may call, for example, ifconfig, ipconfig, ipchains, iptables, ps, route, awk, cat, chmod, cut, grep, head, mkdir, sed, sleep, sort, tail, tr, true, unique, and wc. One of ordinary skill in the art having the benefit of this disclosure will recognize that the foregoing list of utilities is only a small sample of the many different utilities that the SUT 110 may use. For certain utilities, the SUT 110 may provide different command lines to the utility and receive correspondingly different results therefrom. The command lines may vary between operating systems and/or between versions of a particular operating system. Similarly, for certain utilities, the results returned by the utilities depend on the operating system version, hardware configuration, and/or software configuration of the computer or server executing the SUT 110.

To test the SUT 110 under various system configurations, the utility module 114 simulates the utility called by the SUT 110 and returns results extracted from the simulated configuration database 112 to the SUT 110. In addition, or in another embodiment, the utility module 114 may return randomly generated data (e.g., data generated between a range of values that the SUT expects to receive from the utility). The simulated configuration database 112 includes the expected output of the utility called by the SUT 110 for a selected operating system, hardware configuration, and/or software configuration. For example, the simulated configuration database 112 may include the expected utility output for a system configuration comprising a selected version of a selected operating system (e.g., UNIX, Linux, Mac OS, AIX, Solaris, HP-UX, etc.) installed on a computer having one or more network adapters (e.g., an integrated services digital network (ISDN), a wireless network card, an asymmetric digital subscriber line (ADSL) adapter, etc.) installed in various combinations.

In addition to network devices, or in other embodiments, the simulated configuration database 112 may include the expected utility output for any device supported by the selected operating system including, for example, hard drives, flash memory, random access memory (RAM), and any other device that returns data. The simulated configuration database 112 may also include system configuration information and/or database configuration information of any structured query language (SQL) server. For example, the simulated configuration database 112 may include expected output of one or more MySQL tools for a selected system configuration.

The SUT 110 processes the simulated results from the utility module 114 and, in one embodiment, stores its output in the memory device 120. Alternatively, as shown by a dashed line in FIG. 1, the output of the SUT 110 may be passed directly to the comparison module 118 for evaluation. Regardless of whether the comparison module 118 receives the output directly from the SUT 110 or from the memory device 120, the comparison module 118 compares the output of the SUT 110, or a portion thereof, to expected results extracted from the expected results database 116.

In addition to comparing the output of the SUT 110 with an expected result, or in another embodiment, the output from the SUT 110 may be provided directly to another SUT 111, as shown by a dashed line in FIG. 1. The SUT 111 may then process the output from the SUT 110 and, in some embodiments, receive simulated data from the utility module 114 for one or more simulated utilities. The SUT 111 may then provide its output to the comparison module 118 for evaluation, to the memory device 120, or to yet another SUT (not shown). Thus, the system 100 provides testing of different SUTs on different layers.

The expected results database 116 includes expected outputs of the SUT 110 after calling the utility simulated by the utility module 114. The expected outputs of the SUT 110 may be dependent on the simulated operating system, hardware configuration, and/or software configuration. However, in some embodiments, the expected outputs of the SUT 110 are the same, regardless of the simulated operating system, hardware configuration, and/or software configuration. For example, the SUT 110 may return a selected database value regardless of the selected operating system.

As another example, the utility module 114 may be configured to return the text "HP" if the selected hardware configuration includes a Hewlett Packard (HP) computer, the text "Dell" if the selected hardware configuration includes a Dell computer, or the text "Unknown" if the selected hardware configuration includes any other type of computer. The simulated configuration database 112 may include hardware configuration data including the identities of several different types of computers including, for example, HP, Dell, IBM, Toshiba, and other computers. Depending on the selected system configuration, the utility module 114 will retrieve the appropriate hardware configuration data from the simulated configuration database 112 and return either "HP," "Dell," or "Unknown" to the SUT 110. In this example, the SUT 110 then writes the following text on the screen: "Hello, you have 'y'" where y is the output from the utility module 114. Thus, for this example, the expected results database 116 includes "Hello, you have Dell," "Hello, you have HP," and "Hello, you have Unknown." The comparison module 118 compares the SUT's output to the strings in the expected results database for the particular utility and indicates whether the test passed or failed. In this example, the test would fail, for example, if the SUT's output is "Hello, you have Toshiba" (rather than "Hello, you have Unknown") for a selected hardware configuration having a Toshiba computer.

After comparing the output of the SUT 110 with the expected results from the expected results database 116, the comparison module 118 provides test results 122 to a user. The test results 122 may indicate, for example, whether the SUT 110 passed or failed the test and may include detailed data regarding the differences between the output of the SUT 110 and the expected results from the expected results database 116. Although not shown, the system 100 may store the test results 122 in the memory device 120, print the test results, display the test results on a display device, and/or transmit the test results 122 through a network to a remote computer or memory device. The test results 122 may also be used as input for the SUT 111 and/or other SUTs (not shown) and/or saved in a temporary database (not shown) or one of the one or more simulated configuration databases 112 for later use as an input to the SUT 111 and/or the other SUTs. The host system may be configured to control the overall test process between test layers (e.g., between tests for the SUT 110, the SUT 111, and the other SUTs).

Figure 2:
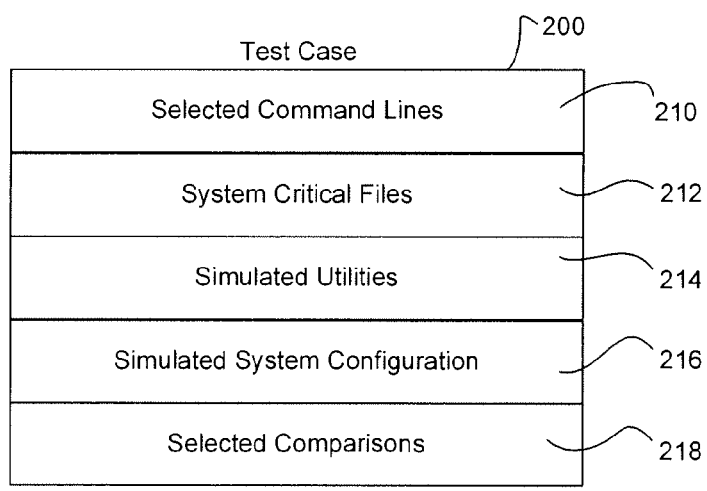
FIG. 2 graphically illustrates a test case usable by the system of FIG. 1 according to one embodiment.

FIG. 2 graphically illustrates a test case 200 usable by the system 100 of FIG. 1 according to one embodiment. The test case 200 includes selected command lines 210, system critical files 212, simulated utilities 214, simulated system configurations 216, and selected comparisons 218. In one embodiment, the test case 200 comprises one or more XML files that specify the simulated system configuration and test parameters under which the SUT 110 is tested. XML files are used because they are very portable between platforms. However, one of ordinary skill in the art having the benefit of this disclosure will recognize that the test case 200 may include other types of files or scripts. For example, the test case 200 may include Ini files, simple text files, binary files, or any other type of file.

The simulated utilities 214 includes a list of utilities simulated by the utility module 114. When the SUT 110 calls one of the selected utilities using one or more of the selected command lines 210, the utility module 114 extracts data from the configuration database 112 based on the simulated system configuration 216. As discussed above, the simulated system configuration 216 specifies an operating system, a hardware configuration, and/or a software configuration. The selected comparisons 218 specify which portions of the SUT's output are to be compared with data from the expected results database 116.

The system critical files 212 include files that are used by the SUT 110 and/or the utility module 114 that, if altered by the SUT 110 and/or the utility module 114 during a test, may cause the computer or server executing the test to stop functioning properly. For example, a file called /etc/passwd may store system passwords. If the SUT 110 and/or the utility module 114 deletes the /etc/passwd file, or deletes or changes one or more of the stored passwords, a user may be prevented from logging into the computer or server hosting the system 100. In addition, or in other embodiments, the system critical files 212 may include any file or directory that a user does not want to be altered by the test.

When a user or the system 100 identifies one or more system critical files 212, the system 100 isolates file system calls within a specified directory, copies the system critical files 212 to the specified directory, and tests the SUT 110 within the isolated environment so as to not alter the original system critical files 212 during the testing. Thus, the SUT 110 may be tested in an isolated environment that simulates selected system configurations without corrupting the computer or server performing the tests.

Figure 3:
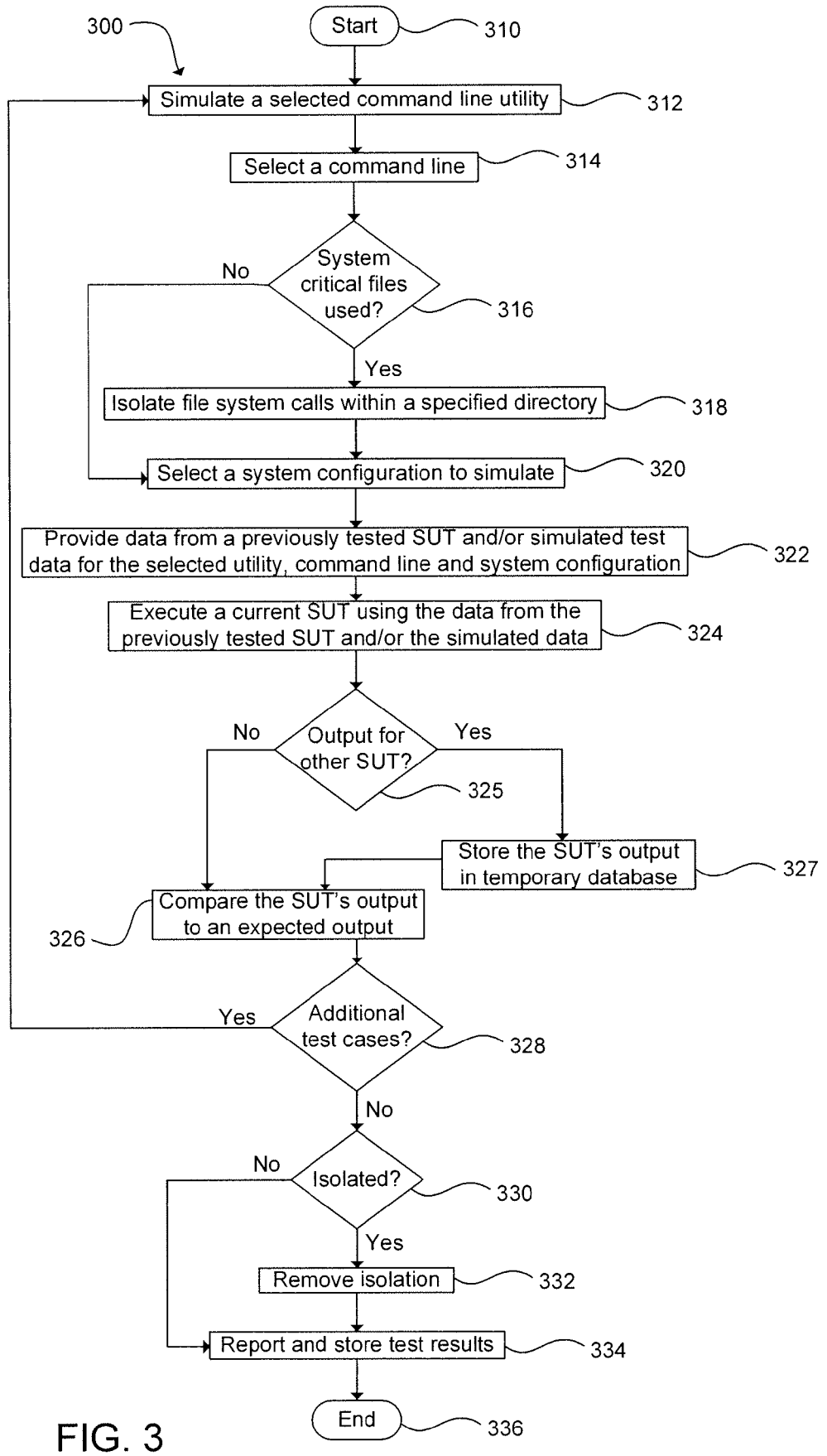
FIG. 3 is a flowchart of a process for testing software under one or more simulated system configurations according to one embodiment.

FIG. 3 is a flowchart of a process 300 for testing software under one or more simulated system configurations according to one embodiment. After starting 310, the process 300 includes simulating 312 a selected command line utility. The selected utility returns system-specific data. The selected utility, if not simulated, returns data specific to a host system performing the process 300. By simulating the selected utility, the host system can simulate various system configurations without emulating each entire system. In one embodiment, the simulated utility intercepts the call to the selected utility and returns simulated configuration data.

The process 300 also includes selecting 314 a command line to pass to the simulated utility. The simulated utility may be configured to provide different responses to a plurality of different command lines. Further, different operating systems or operating system versions may handle different command lines in different ways. Thus, a user may select which command lines to test.

The process 300 then queries 316 whether system critical files are used during the test using the selected command line. If system critical files are not used, the process 300 proceeds with the test (see step 320 below). However, if system critical files are used, the process 300 isolates 318 file system calls within a specified directory. As discussed in detail below, in one embodiment, the process 300 executes a chroot command to change the root directory to an isolated "jail" directory. Directories and files used during the test, including the simulated utility, are copied into the "jail" directory where they can be accessed and modified without changing the original files.

The process 300 then selects 320 a system configuration to simulate. As discussed above, the system configuration may include, for example, a selected operating system or operating system version, a selected hardware configuration, a selected software configuration, and/or other system variables that alter the results of the selected utility.

The process 300 then provides 322 from a previously tested software under test (SUT) and/or simulated test data associated with the selected utility, the selected command line, and the selected system configuration. The simulated test data may be generated, for example, by testing the selected utility using selected hardware and/or software configurations with selected operating systems. Further, or in another embodiment, the simulated test data may be received from hardware and/or software providers (e.g., designers, manufactures, sellers, etc.) that know (e.g., by testing and/or by design) how the selected utility should function with their products as used with the selected operating systems.

The host system then executes 324 a current SUT using the data from the previously tested SUT and/or the simulated test data. If simulated test data is used, the current SUT calls the selected utility. However, instead of receiving data from the actual utility, the current SUT receives the simulated test data from the simulated utility. The current SUT then performs one or more operations on the simulated test data. For example, the current SUT may perform calculations based on the simulated test data, parse the simulated test data, format the simulated test data, or perform other operations using the simulated test data. The current SUT then provides an output based on the one or more operations performed on the simulated test data.

The process 300 then queries 325 whether the output of the current SUT is to be saved for use during the testing of a later tested SUT. If yes, the process 300 stores 327 the current SUT's output in a temporary database until such time as it is provided as an input to the later tested SUT. The process 300 then compares 326 the current SUT's output to an expected output. If the output of the current SUT is not to be saved, the process 300 compares 326 the current SUT's output to an expected output. Depending on the test being performed, all or a portion of the current SUT's output may be compared to the expected output. The expected output depends on the desired function of the current SUT and may depend on the selected command line and/or the selected system configuration. However, one of ordinary skill in the art having the benefit of this disclosure will recognize that for a particular utility and selected command line, the current SUT's output may be configured to be the same regardless of the selected system configuration. For example, the current SUT may be configured to determine the number and type of network adapters installed in a simulated system regardless of the simulated system's operating system.

The process 300 then queries 328 whether there are additional test cases for the host system to run. If there are additional test cases, the process 300 returns to step 312 so that the host system can execute an additional test case using different utilities, command lines, and/or system configurations. If files have been modified during the previous test case, the host system may modify the changed files to remove changes made during the previous test case. For example, the host system may re-copy the original files into the isolated "jail" directory before executing the next test case.

If there are not additional test cases, the process 300 queries 330 whether the testing framework is still in an isolated environment. If isolation still exists, the process 300 removes 332 the isolation. For example, the process 300 may exit from the "jail" directory to return to the original root directory. The process 300 reports and stores 334 the test results and then the process 300 ends 336. The process 300 stores the test results because the test results can be used later (e.g., for other SUTs) and/or the test results can be compared to results from earlier or later test runs for the current SUT. For example, a user may want to find differences in an SUT's behavior for current test results and test results acquired two weeks ago.

Figure 4A:
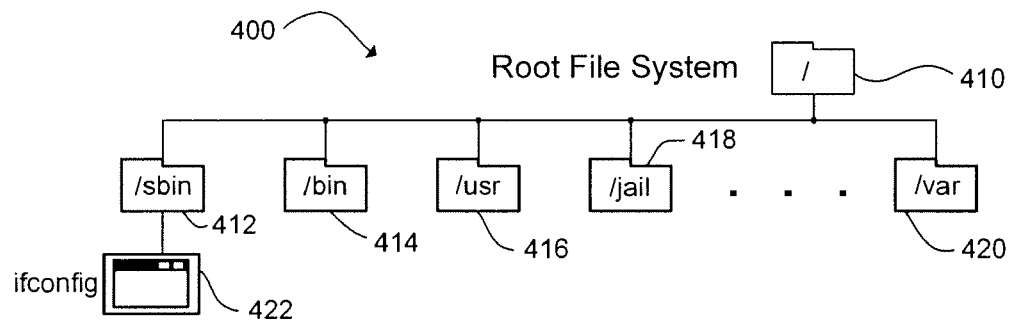
FIG. 4A graphically represents an example file system according to one embodiment.
Figure 4B:
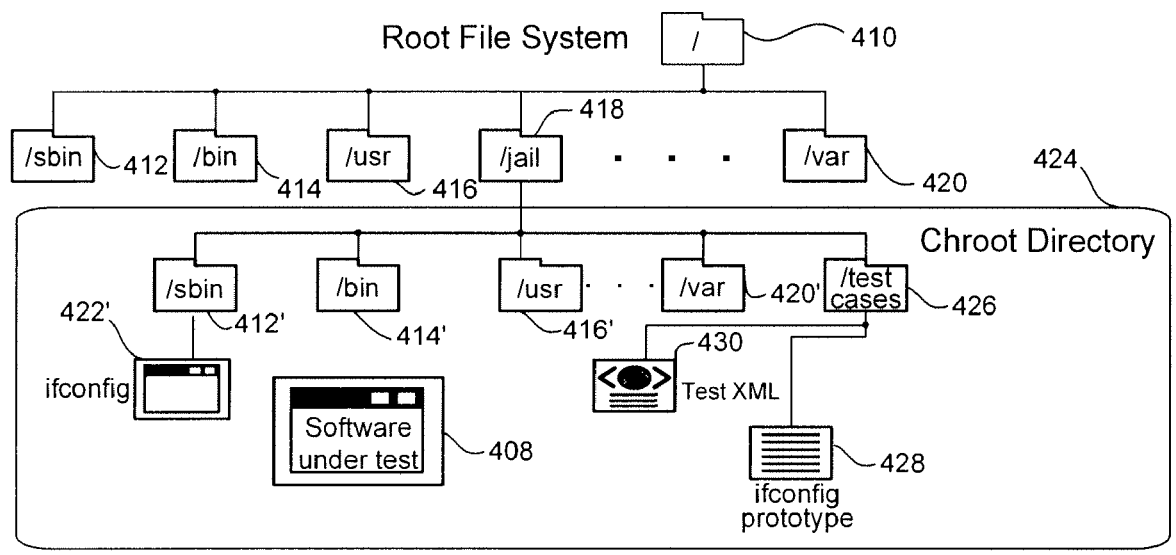
FIG. 4B graphically represents an example chroot directory for isolating a test environment according to one embodiment.
Figure 4C:
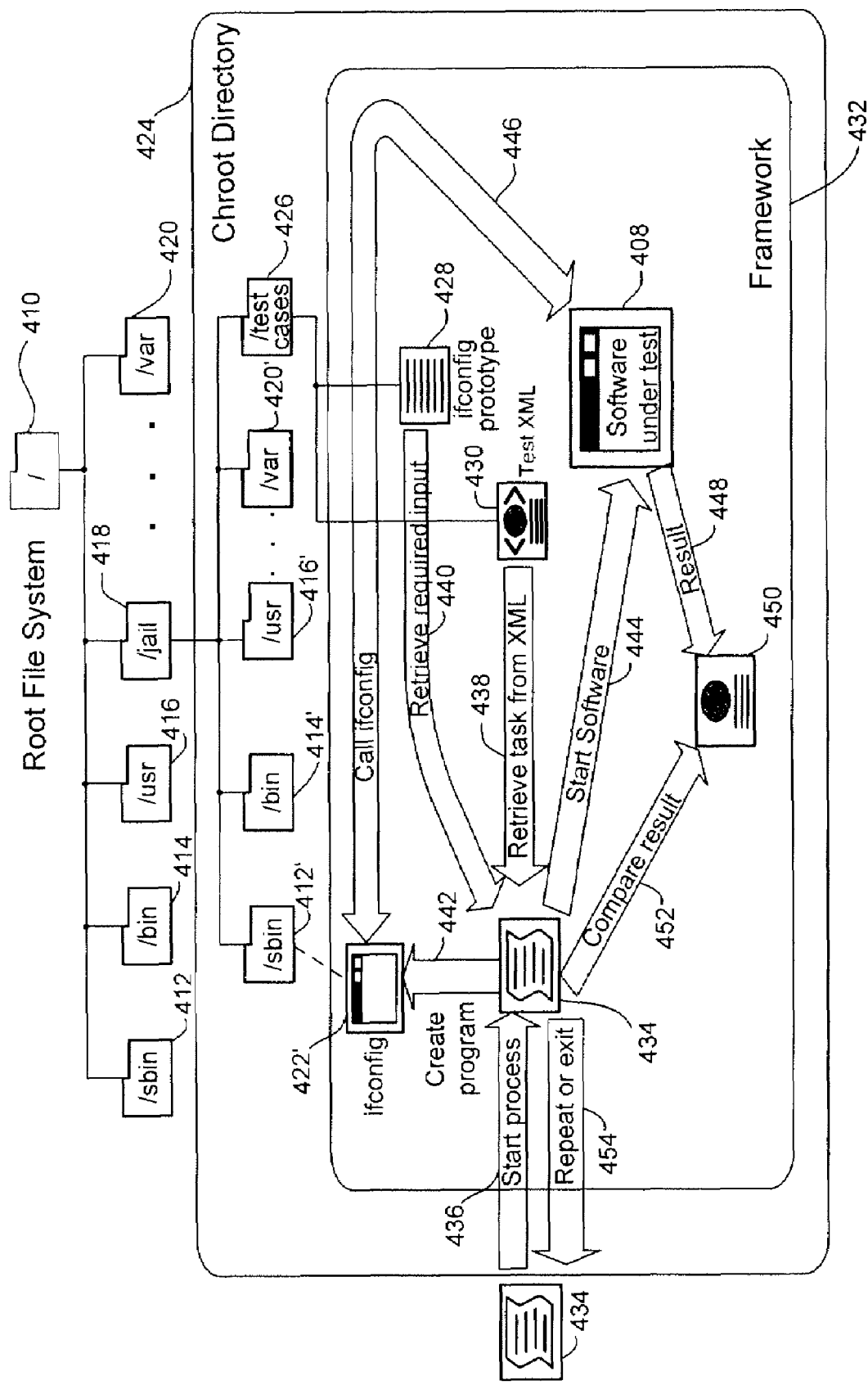
FIG. 4C graphically represents an example software testing framework isolated in the chroot directory of FIG. 4B according to one embodiment.

FIGS. 4A-4C illustrate an example embodiment in which a host system uses a combination of Perl scripts, shell scripts, and XML or text files to create a chroot "jail" directory environment and execute test cases corresponding to different system configurations within the chroot "jail" directory environment. In one embodiment, the Perl scripts control the overall test process, the shell scripts create the chroot "jail" directory environment for particular operating systems, and the XML or text files define specific test cases. Perl scripts are used, for example, because they are generally portable and are not required to be compiled for every architecture. Thus, the testing framework described in this example embodiment can be used on AIX, Solaris, HP-UX, Linux, Mac OS X, and other operating systems supporting scripting languages and having command line tools. One of ordinary skill in the art having the benefit of this disclosure will recognize that Perl scripts are not required and that any script or programming language may be used. For example, C or C++ may be used for the overall test process and compiled for the processor architecture of the host system.

In this example, the SUT 408 (shown in FIGS. 4B-4C) is configured to capture information regarding a network's hardware, software, and users. The SUT 408 provides the captured information to, for example, a server so that system administrators can analyze the network (e.g., determine the number of computers connected to the network with certain processors, processing speeds, memory capacity, network adaptors and other information related to TCP/IP and network configuration).

FIG. 4A graphically represents an example file system 400 according to one embodiment. The example file system 400 has a root directory 410 and sub-directories including an /sbin sub-directory 412, a /bin sub-directory 414, a /usr sub-directory 416, a /jail sub-directory 418, and a /var sub-directory 420. The /sbin sub-directory 412 includes an ifconfig utility 422, as is known in the art, to configure a network interface for TCP/IP (e.g., set the interface's IP address and netmask, bring the interface up or down, etc.). One of ordinary skill in the art having the benefit of this disclosure will recognize that the ifconfig utility 422 is used by way of example only, and not by limitation.

The ifconfig utility 422 allows the SUT 408 to retrieve system information without linking to platform specific libraries that are very different between different operating systems and/or operating system versions (e.g., from UNIX version to UNIX version or from UNIX to Linux). Thus, using the ifconfig utility 422 allows the SUT 408 to be very portable between systems. The ifconfig utility 422 returns information corresponding to network devices and TCP/IP settings. By way of example only, and not by limitation, the ifconfig utility 422 may return the following example data for a selected system configuration:

```
#ifconfig
eth0    Link encap: Ethernet HWaddr 00:0C:29:AD:74:85
        inet addr: 172.18.254.116 Bcast: 172.18.255.255 Mask:
        255.255.0.0
        UP BROADCAST NOTRAILERS RUNNING MULTICAST
            MTU: 1500 Metric: 1
        RX packets: 2877229 errors: 0 dropped: 0 overruns: 0 frame: 0
        TX packets: 208956 errors: 0 dropped: 0 overruns: 0 carrier: 0
        collisions: 0 txqueuelen: 100
        RX bytes: 224629903 (214.2 Mb) TX bytes: 18441187
        (17.5 Mb)
        Interrupt: 10 Base address: 0x1080
Lo      Link encap: Local Loopback
        inet addr: 127.0.0.1 Mask: 255.0.0.0
        UP LOOPBACK RUNNING MTU: 16436 Metric: 1
        RX packets: 47790 errors: 0 dropped: 0 overruns: 0 frame: 0
        TX packets: 47790 errors: 0 dropped: 0 overruns: 0 carrier: 0
        collisions: 0 txqueuelen: 0
        RX bytes: 4205264 (4.0 Mb) TX bytes: 4205264 (4.0 Mb)
```

In this example, the SUT 408 is configured to parse the information returned from the ifconfig utility 422 so that certain portions of the information can be displayed to a user in an easily understood format. However, the ifconfig utility 422 returns different information for different system configurations. For example, the returned data may include different or additional information if a different Linux operating system is used, a foreign language system (e.g., a UNIX or AIX system with utilities that output data in a foreign language) is used, an ISDN adapter is installed, a wireless network adapter is installed, an ADSL adapter is installed, an ATM adapter is installed, any other network devices are installed, or if a different number of network adapters are installed. For example, the ifconfig utility 422 will return more information if ten network adapters are installed than if only three network adapters are installed. Thus, the SUT 408 is configured to parse and format the various amounts and types of information returned by the ifconfig utility 422 for different system configurations.

The SUT's ability to parse and format the different information provided by the ifconfig utility 422 for different system configurations may be tested, for example, by executing the SUT 408 on each different system. However, purchasing and configuring each different system, with different operating systems and hardware combinations, is expensive and time consuming. Thus, according to this example embodiment, when the SUT 408 calls the ifconfig utility 422, the host system returns simulated results to the SUT 408 corresponding to a selected operating system, hardware configuration, software configuration, and/or other configuration parameters. Thus, by predetermining the expected outputs of the ifconfig utility 422 for various system configurations, the SUT 408 can be tested relatively quickly and inexpensively using a single host computer.

As discussed above, in some embodiments, it is desirable to isolate file system calls within a specified directory, copy system critical files to the specified directory, and test SUT 408 within the isolated environment so as to not alter the original system critical files during testing. For example, FIG. 4B graphically represents an example chroot directory 424 for isolating a test environment according to one embodiment. The chroot directory 424 is created by executing a chroot command and designating the /jail sub-directory 418 as the new root directory. One of ordinary skill in the art having the benefit of this disclosure will recognize that the new root directory may be given any name (e.g., not just /jail) and may be located within any directory or sub-directory.

In this example, the sub-directories 412, 414, 416, 420 are copied into the chroot directory 424 (shown as sub-directories 412', 414', 416', 420', respectively). As discussed below, the ifconfig utility 422 is also simulated in the chroot directory 424 (shown as ifconfig utility 422') in the /sbin sub-directory 412'. Thus, when the SUT 408 executes in the chroot directory 424, the SUT 408 will see the ifconfig utility 422' as if it were the ifconfig utility 422 under the root directory 410.

A /test cases sub-directory 426 is also created in the chroot directory 424. The /test cases sub-directory 426 includes an ifconfig prototype 428 and one or more test cases in the form of a test XML file 430. As discussed above, the test cases may be in other formats for storing test data including, for example, Ini files, text files, or binary files. In one embodiment, the test cases may be generated in real time from a database with the desired prototypes and prerequisites. The ifconfig prototype 428 includes the simulated results of the ifconfig utility 422' for various different system configurations.

FIG. 4C graphically represents an example software testing framework 432 isolated in the chroot directory 424 of FIG. 4B according to one embodiment. The framework 432 shown in FIG. 4C illustrates the testing process used in this example. A Perl script 434 starts 436 the testing process by retrieving 438 a task (e.g., a test case) from the test XML file 430.

Based on a simulated system configuration specified in the test XML file 430, the Perl script 434 retrieves 440 required input from the ifconfig prototype 428 and uses the required input to create 442 the simulated ifconfig utility 422'. Again, use of the XML format is not required and the any format may be used. Further, data may be taken directly from a database, as described above in relation to FIG. 1. In one embodiment, the simulated ifconfig utility 422' comprises a shell script that returns the information from the ifconfig prototype 428 corresponding to the selected system configuration. The Perl script 434 then starts 444 the SUT 408, which in turn calls 446 the simulated ifconfig utility 422'.

Upon receiving the simulated results from the simulated ifconfig utility 422', the SUT 408 saves 448 the result in an output file 450. The Perl script 434 then compares 452 the result stored in the output file 450 with an expected result. The Perl script 434 then repeats 454 the process using a different test case specifying a different system configuration or, if there are no additional test cases, exits the chroot directory 424 and reports the test results to a user.

One of ordinary skill in the art having the benefit of this disclosure will recognize that the embodiments disclosed herein may be modified to simulate more than command line utilities. For example, system libraries or other binaries used by the SUT 408 can also be simulated for selected system configurations. Further, in operating systems such as Solaris or Linux, virtualization kernel features such as Xen and Zones may be used to simulate not only the root file system but almost all kernel calls without performance loss. Thus, hardware drivers may be tested using the embodiments disclosed herein.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method for testing software, at least a portion of the method being performed by a computing device comprising at least one processor, the method comprising:
   isolating file system calls within a selected directory;
   simulating a command line utility within the selected directory, the simulated command line utility providing simulated data that is specific to a particular system configuration comprising a particular operating system running on a particular system architecture;
   testing software under test (SUT) for the particular system configuration by:
      executing the SUT within the selected directory, the SUT:
         calling the command line utility to provide the simulated data that is specific to the particular system configuration;
         processing the simulated data;
         providing an output based on the simulated data;
      comparing the SUT's output to an expected output.

2. The method of claim 1, further comprising:
   storing the SUT's output; and
   providing the SUT's output as an input to a later tested SUT.

3. The method of claim 1, further comprising:
   storing the SUT's output; and
   comparing the SUT's output to previously acquired test data corresponding to the SUT.

4. The method of claim 1, wherein isolating file system calls within the selected directory comprises:
   changing a root directory to the selected directory; and
   copying files called by the SUT to the selected directory.

5. The method of claim 4, wherein the root directory is changed to the selected directory in response to determining that the SUT accesses data critical to a host system.

6. The method of claim 4, wherein changing the root directory comprises executing a chroot operation by a system call, by running a chroot utility, or by running a script or utility to setup a chroot environment.

7. The method of claim 1, wherein simulating the command line utility comprises generating a script within the selected directory that returns the simulated data in response to the SUT calling the simulated command line utility.

8. The method of claim 1, further comprising determining, based on the comparison of the SUT's output and the expected output, whether the SUT passed or failed the software test for the particular system configuration.

9. The method of claim 8, wherein determining whether the SUT passed or failed the software test for the particular system configuration comprises:
   generating test results that indicate whether the SUT passed or failed the software test for the particular system configuration;
   providing the test results to a user of a computing system.

10. The method of claim 1, wherein the particular system configuration comprises a selected number of network adapters.

11. The method of claim 1, wherein the particular system configuration comprises a selected software configuration.

12. The method of claim 1, further comprising:
   determining that the SUT calls one or more system critical files; and
   in response to the determination, copying the system critical files to the selected directory.

13. A system for testing software, the system comprising:
   a utility module for simulating data provided by a command line utility called by software under test (SUT), the simulated data being specific to a particular system configuration that comprises a particular operating system running on a particular system architecture;

a memory for storing an output from the SUT, the SUT's output comprising processed data corresponding to the simulated data; and a comparison module in communication with the memory, the comparison module for comparing the processed data to an expected result to test the SUT for the particular system configuration.

14. The system of claim 13, wherein the memory comprises a file system having a root directory, the root directory comprising:

a first sub-directory having the command line utility stored therein; and a second sub-directory configured to isolate the SUT from the first sub-directory.

15. The system of claim 14, wherein the second sub-directory isolates the SUT from the first sub-directory in response to a chroot command.

16. The system of claim 14, wherein the second sub-directory comprises copies of one or more files called by the SUT.

17. The system of claim 16, wherein the SUT is configured to modify the one or more files.

18. The system of claim 13, further comprising a simulated configuration database comprising the simulated outputs of the command line utility for a plurality of system configurations.

19. A non-transitory computer readable medium having stored thereon computer executable instructions for performing a method for testing software, the method comprising:

simulating a command line utility, the command line utility providing simulated data accessed by software under test (SUT), the simulated data being specific to a particular system configuration that comprises a particular operating system running on a particular system architecture;

determining the SUT's potential for damaging one or more system files during execution;

based on the determination, isolating the SUT's file system calls within a selected directory;

testing the SUT for the particular system configuration by:
executing the SUT, the SUT providing an output based on processing the simulated data; and
comparing the SUT's output to an expected output.

20. The computer readable medium of claim 19, wherein isolating file system calls within the selected directory comprises:

changing a root directory to the selected directory; and copying the one or more system files to the selected directory.

21. The computer readable medium of claim 19, wherein simulating the command line utility comprises generating a script that returns the simulated data in response to the SUT calling the command line utility.

22. The computer readable medium of claim 19, wherein simulating the command line utility comprises generating a script that returns the simulated data in response to the SUT calling a library.

23. The computer readable medium of claim 19, wherein simulating the command line utility comprises generating a script that returns the simulated data in response to the SUT reading a system file.

24. The computer readable medium of claim 19, wherein the selected system configuration comprises a selected operating system.

25. The method of claim 1, wherein simulating the command line utility within the selected directory comprises simulating the command line utility within the selected directory to enable the SUT to be tested for the particular system configuration without emulating the entire system configuration.

26. The method of claim 1, wherein simulating the command line utility within the selected directory comprises simulating the command line utility within a selected directory of a computing device that includes:

the particular system architecture;

the particular operating system running on the particular system architecture.

27. The method of claim 26, wherein testing the SUT for the particular system configuration comprises testing the SUT on the computing device that includes:

the particular system architecture;

the particular operating system running on the particular system architecture.

28. The method of claim 1, wherein providing the simulated data that is specific to the particular system configuration comprises providing simulated data that is specific to a particular operating system running on an x86 architecture.

29. The method of claim 1, wherein simulating the command line utility within the selected directory comprises simulating the command line utility within a selected directory of a computing device that includes a system configuration that is different than the particular system configuration for which the SUT is being tested.

30. The method of claim 29, wherein the different system configuration comprises at least one of:

a system architecture that is different than the particular system architecture;

an operating system that is different than the particular operating system.

31. The method of claim 30, wherein testing the SUT for the particular system configuration comprises testing the SUT on the computing device that includes at least one of:

the system architecture that is different than the particular system architecture;

the operating system that is different than the particular operating system.

32. The method of claim 29, wherein the SUT comprises a script that enables the computing device to test the SUT even though the computing device includes a system configuration that is different than the particular system configuration for which the SUT is being tested.

33. The method of claim 1, wherein the expected output comprises an expected output that is specific to the particular system configuration for which the SUT is being tested.

* * * * *